United States Patent Office 3,475,418
Patented Oct. 28, 1969

3,475,418
11 - DESOXY - 16α,17α-DIHYDROXY - 20 - OXO - 4-PREGNENO- AND 4,6 - PREGNADIENO-PYRAZOLES AND 16α,17α - ACETALS AND KETALS THEREOF
Ralph F. Hirschmann, Scotch Plains Township, Union County, and Arthur A. Patchett, Cranford Township, Union County, N.J., assignors to Merck & Co., Inc., Rahway, N.J., a corporation of New Jersey
No Drawing. Continuation of application Ser. No. 287,188, June 12, 1963. This application Aug. 26, 1965, Ser. No. 482,918
Int. Cl. C07c *173/10, 169/34;* A61k *17/00*
U.S. Cl. 260—239.5                                    16 Claims

ABSTRACT OF THE DISCLOSURE

The invention disclosed herein relates to 16α,17α-dihydroxy - 20-oxo-steroidal-pyrazoles of the pregnane series which are unsubstituted at the 11-position, and to the 16α,17α-acetals and ketals thereof. Although devoid of oxygen at C–11, these 11 - desoxy-steroidal pyrazoles possess high anti-inflammatory activity and are valuable for topical administration.

---

This is a continuation of application Serial No. 287,188, filed June 12, 1963, now abandoned, which is a continuation-in-part of application Serial No. 262,304, filed Mar. 4, 1963, now abandoned, which is a continuation-in-part of application Serial No. 203,748, filed June 20, 1962 now U.S. Patent 3,148,183, which, in turn, is a continuation-in-part of applications Serial No. 88,659, filed Feb. 13, 1961, now U.S. Patent 3,094,540; Serial No. 177,167, filed Mar. 5, 1962, now U.S. Patent 3,072,639; Serial No. 177,194, filed Mar. 5, 1962, now U.S. Patent 3,072,640; Serial No. 177,195, filed Mar. 5, 1962, now U.S. Patent 3,072,641; and Serial No. 177,262, filed Mar. 5, 1962, now U.S. Patent 3,072,642.

This invention is concerned generally with novel steroids and with processes of preparing the same. More particularly it relates to novel 11-desoxy-16α,17α-dihydroxy-20-oxo - 4-pregneno- and 4,6-pregnadieno-[3,2-c]pyrazole compounds and to the 16α,17α-acetals and ketals of these [3,2-c]pyrazoles.

The novel compounds which form the subject of the present invention are the 11-desoxy-16α,17α-dihydroxy-20-oxo-4-pregneno- and 4,6-pregnadieno-20-oxo-[3,2-c]-pyrazoles and the 16α,17α-acetals and ketals thereof. These compounds have structural Formulas A and B.

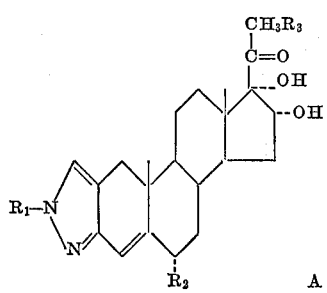

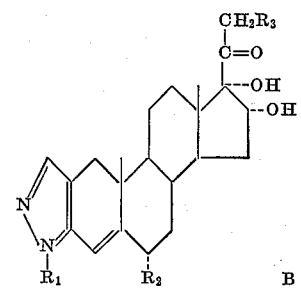

wherein $R_1$ is hydrogen, acyl, alkyl, aralkyl, cycloalkyl, aryl, a heterocyclic nucleus, or substituted derivatives thereof and $R_2$ is hydrogen, methyl, fluoro, or chloro and $R_3$ refers to hydrogen, chloro, fluoro, hydroxy, acyloxy, the dihydrogen phosphate, and the alkali metal salts of the dihydrogen phosphate.

The 16α,17α-acetals and ketals of the above compounds have the following structures:

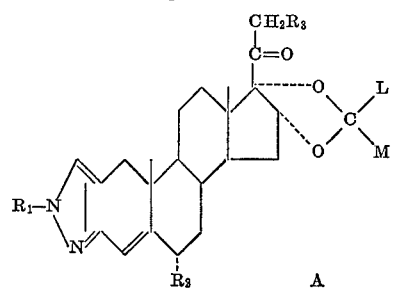

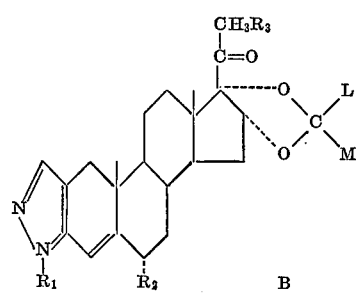

wherein $R_1$, $R_2$ and $R_3$ have the meaning above defined and wherein L and M are each selected from the group consisting of hydrogen, alkyl and aryl, and together with the carbon to which they are joined, L and M are cycloalkyl.

In all of the above structures a double bond may be present at the $\Delta^6$ position. The above defined [3,2-c]-pyrazole-steroids possess high anti-inflammatory activity and are especially effective as topical agents and for the treatment of arthritis and related diseases since they can be administered for their cortisone-like action in low dosage thereby minimizing undesirable side effects.

In preparing our novel chemical compounds, a 16α,17α-dihydroxy-4-pregnene (or 4,6-pregnadiene) 3,20-dione having a protected side chain is treated with an alkyl formate and sodium hydride in an inert atmosphere to form the corresponding 2-hydroxymethylene derivative. The 2-hydroxymethylene derivative is designated on Flow Sheet B as compound 10, and on Flow Sheet C as compound 22. In a preferred embodiment of our invention, the steroid is dissolved in a solvent such as benzene or pyridine and the resulting solution is cooled to room temperature and treated with ethyl formate. The air in the system is replaced with nitrogen, sodium hydride or alkoxide is added and the mixture is stirred at room temperature for several hours.

The 2-hydroxymethylene compound and/or its derived formates reacts with hydrazine in an inert atmosphere to form the corresponding [3,2-c]pyrazole.

Upon treatment of the 2-hydroxymethylene-compound with a lower alkanol in the presence of an acidic reagent such as p-toluenesulfonic acid the corresponding 2-alkoxymethylene-compound is formed. When the hydroxymethylene compound containing variable amounts of the alkoxymethylene derivative is reacted with a monosubstituted hydrazine, the N-substituted [3,2-c]pyrazole derivative is formed.

The above compounds are shown on Flow Sheet B as compounds 12A and 12B and on Flow Sheet C as compounds 23A and 23B. The mixture of products may be separated by chromatography. The N-substituted-[3,2-c] pyrazoles having structure A are designated as the 1' substituted [3,2-c]pyrazoles and the N-substituted compounds having structure B are designated as the 2'-substituted [3,2-c]pyrazoles.

Upon treatment of a 2-hydroxymethylene-compound directly with a monosubstituted arylhydrazine, without the intermediate formation of the 2-alkoxymethylene-derivative, one isomer is generally formed in preponderant amounts, whereas when reacting the 2-alkoxymethylene-compound with a monosubstituted arylhydrazine, significant amounts of both isomers are obtained. When these reactions take place with monosubstituted-alkylhydrazines, mixtures may be obtained when starting with the 2 - hydroxymethylene - steroid as well as with the 2-alkoxymethylene-steroid. A mixture of isomers may also result from the reaction of a mono-substituted-hydrazine with a 2-hydroxymethylene-compound which possibly contains variable amounts of the 2-alkoxymethylene-compound due to the operating procedures employed, for example, due to recrystallization in the presence of a trace of alcohol a solution of the 2-hydroxymethylene-compound from which acid has not been completely removed.

Any formate ester groups present in the resulting [3,2-c]pyrazole may be removed by refluxing the steroid for about 2 hours with a mixture of potassium hydroxide in ethanol.

Among the monosubstituted hydrazines which may be used for the process of our invention are: alkylhydrazines, such as methylhydrazine, ethylhydrazine, propylhydrazines, butylhydrazines, β - hydroxyethylhydrazine; cycloalkylhydrazines; monosubstituted - hydrazines which may be derived from an aromatic or heterocyclic ring nucleus including phenylhydrazine and the substituted phenylhydrazines, such as o-, m-, and p-halophenylhydrazines, o-, m-, and p-tolylhydrazines, o-, m-, and p-nitrophenylhydrazines, 1 - hydrazino-naphthalene; 2 - hydrazinopyridine, 3 - hydrazinopyridine, 4-hydrazinopyridine, 2-hydrazinothiophene, 3-hydrazinothiophene, 4-hydrazinopyridine oxide, and 2-hydrazinopyrimidine; aralkylhydrazines, such as benzylhydrazine and phenylethylenehydrazine.

There are thus produced the corresponding N-substituted - [3,2-c]pyrazoles including; N - alkyl such as N-methyl-, N-ethyl-, N-butyl-, N-propyl-, N - (β-hydroxyethyl)-, N-cycloalkyl, N-substituted derivatives which may be derived from any aromatic or heterocyclic nucleus, including N-phenyl- and the N-substituted-phenyl derivatives such as o-, m-, and p-halophenyl; o-, m-, and p-tolyl-; o-, m-, and p-alkoxyphenyl-, o-, m-, and p-nitrophenyl-; N - (1″ - naphthyl)-, N-(2″-pyridyl)-, N-(3″-pyridyl)-, N - (4″ - pyridyl)-, N-(4″-pyridyloxide)-, N-(2″-pyrimidyl)-; N-(2″-thiophene)-, N-(3″-thiophene)-; N-aralkyl-, such as N-benzyl- and N-phenylethenyl-[3,2-c]pyrazoles.

The N-alkyl-[3,2-c]pyrazoles may also be prepared by direct alkylation of the N-unsubstituted-[3,2-c]pyrazoles.

The side chain may be protected by forming the 16α, 17α-acetal or ketal, together with a tetrahydropyranyl group at carbon-21, as shown in compound 10 of Flow Sheet B. The side chain of the steroid may also be protected with an ethylenedioxy group at carbon-20, and an acyl group at carbon-21 as shown in compound 21 of Flow Sheet C.

The 21 - tetrahydropyranyloxy-16α,17α-(acetal or ketal) - 4 - pregnene (or 4,6-pregnadiene)-3,20-dione is prepared from a known 17α,21-dihydroxy-4-pregnene-3, 20-diene as indicated on Flow Sheets A and B, compounds 1 through 10, detailed procedures for which are given in Examples 1–3.

The 20 - ethylenedioxy-21-acylate is prepared from a known 17α,21 - dihydrovy-4-pregnene-3,20-dione as indicated on Flow Sheet C, detailed procedures for which are given in Example 4.

The 16α,17α-dihydroxy-steroid is converted into the 16α,17α-acetal or ketal by treating with a carbonyl reactant of the general formula:

wherein L and M are each selected from the group consisting of hydrogen, alkyl, and aryl, and together with the carbon to which they are joined, L and H are cycloalkyl. For example, a suspension of the free 16α,17α,21-triol in a ketone or aldehyde is treated with a trace of perchloric acid and stirred at room temperature until solution is complete. The ketones and aldehydes which are particularly suitable for this purpose include acetaldehyde, methyl ethyl ketone, cyclohexanone, and acetophenone. In a preferred embodiment of our invention acetone is used. The 16α,17α,acetonide group may be removed by heating for a short time with 60% formic acid.

The products of our invention include, among others, the following: 16α,17α,21-trihydroxy-20-oxo-4-pregneno-[3,2-c]pyrazole, 6α-chloro-16α,17α,21-trihydroxy - 20-oxo-4-pregneno-[3,2-c]pyrazole, 6α-fluoro-16α,17α,21-trihydroxy-20-oxo-4-pregneno-[3,2-c]pyrazole, 16α,17α,21-trihydroxy-6α-methyl-20-oxo-4-pregneno-[2,3-c]pyrazole, 16α,17α,21 - trihydroxy - 20 - oxo - 4,6 - pregnadieno-[3,2 - c]pyrazole, 6 - chloro - 16α,17α,21 - trihydroxy-20 - oxo - 4,6 - pregnadieno - [3,2 - c]pyrazole, 6 - fluoro-16α,17α,21 - trihydroxy - 20 - oxo - 4,6 - pregnadieno-[3,2 - c]pyrazole, 16α,17α,21 - trihydroxy - 6 - methyl-20 - oxo - 4,6 - pregnadieno - [3,2 - c]pyrazole. This invention also includes the 16α,17α-acetals and ketals of the foregoing compounds, as well as the 1'- and 2'-alkyl-, the 1'- and 2'-cycloalkyl-, the 1'- and 2'-aralkyl- and the 1'- and 2'-aryl derivatives of all the above named compounds.

The 21-acyl derivatives of the N-substituted-21-hydroxy - 16α,17α-dihydroxy - (acetal or ketal) - 20 - oxo-4 - pregneno - (or 4,6 - pregnadieno) - [3,2 - c]pyrazole are prepared by treating with one equivalent of an acylating agent, e.g. a lower hydrocarbon carboxylic acid acylating agent such as benzoic anhydride, tertiary butyl acetyl chloride; a lower alkanoic anhydride or lower alkanoyl halide such as acetic anhydride, propionic anhydride; or a polybasic anhydride such as β,β-dimethylglutaric anhydride, succinic anhydride and the like, in the presence of an organic base such as pyridine.

The 21-acyl derivatives of the N-unsubstituted - [3,2-c]pyrazole compounds of our invention are prepared by reacting the latter compounds with 2 equivalents of the acylating agent to form the N-acyl-21-acylate and then heating the latter compound with aqueous acetic acid, whereupon the N-acyl group is selectively removed. (Compare Flow Sheet D, compounds 26 and 27.)

The N-acyl-derivatives of the 21-hydroxy compounds of our invention are prepared by treating the N-unsubstituted - 21 - tetrahydropyranyl ether derivatives with an acylating agent, e.g. a lower hydrocarbon carboxylic acid acylating agent such as benzoic anhydride, tertiary butyl acetyl chloride; a lower alkanoic anhydride or lower alkanoyl halide such as acetic anhydride, propionic anhydride; or a polybasic anhydride such as $\beta,\beta$-dimethyl-glutaric anhydride, succinic anhydride and the like, in the presence of an organic base such as pyridine. The 21-tetrahydropyranyl ether group is then removed by treating a methanol solution of the steroid with p-toluenesulfonic acid. (Compare Flow Sheet D, compounds 28 and 29.)

In order to convert the 21-hydroxy group of an N-substituted pyrazole compound of our invention (Compounds 13, 25 and 29 of Flow Sheet E) into the corresponding 21-desoxy-derivatives (Compound 44), the 21-hydroxy-compound is first reacted with methanesulfonyl chloride in a non-aqueous base to form the 21-mesylate (Compound 30). The 21-mesylate is heated with an alkali iodide to form the 21-iodo-steroid (Compound 32), which is then reacted with an alkali metal bisulfite to form the 21-desoxy-derivative (Compound 33).

In order to convert the 21-hydroxy group of an N-unsubstituted-pyrazole compound of our invention (Compounds 13 and 25 of Flow Sheet E) into the corresponding 21-desoxy derivative, the N-unsubstituted steroid is first transformed into the N-carbamoyl derivative by treating with a methanolic solution of potassium cyanate to which HCl has been added. The N-carbamoyl derivative is then transformed into the various derivatives indicated on Flow Sheet E. The N-carbamoyl group is finally removed by treatment with nitrous acid.

The 21-desoxy-compounds of our invention include the following: 16α,17α - dihydroxy - 20 - oxo - 4 - pregneno-[3,2 - c]pyrazole, 6α - chloro - 16α,17α - dihydroxy - 20-oxo - 4 - pregneno - [3,2 - c]pyrazole, 6α - fluoro-16α,17α-dihydroxy-20-oxo-4-pregneno - [3,2 - c]pyrazole, 16α,17α - dihydroxy - 6α - methyl - 20 - oxo - 4 - pregneno - [3,2 - c]pyrazole, 16α,17α - dihydroxy - 20 - oxo-4,6 - pregnadieno - [3,2 - c]pyrazole, 6 - chloro - 16α,17α-dehydroxy-20-oxo-4,6-pregnadieno-[3,2-c]pyrazole, 6-fluoro-16α,17α-dihydroxy-20-oxo - 4,6 - pregnadieno - [3,2-c]pyrazole, 16α,17α - dihydroxy - 6 - methyl - 20 - oxo-4,6 - pregnadieno - [3,2 - c]pyrazole. This invention also includes the 16α,17α-acetals and ketals of the foregoing compounds, as well as the 1'- and 2'-acyl-, the 1'- and 2'-alkyl, the 1'- and 2'-cycloalkyl-, the 1'- and 2'-aralkyl-derivitives, and the 1'- and 2'-aryl derivatives of all of the above named compounds.

The 21-fluoro-derivatives of all of the above named compounds are obtained by heating the corresponding 21-mesylate with an alkali metal fluoride, preferably in a solvent such as dimethyl-formamide.

The 21-chloro-derivatives of all of the above named compounds are obtained by heating the 21-mesylate with lithium chloride in a solvent such as dimethylformamide.

The 21-dihydrogen phosphate esters are prepared by the reaction of the corresponding 21-iodo compound with a mixture of silver phosphate and phosphoric acid. Both the mono and dialkali metal salts may be obtained by neutralization of the dihydrogen phosphate ester with an alkali metal hydroxide. Treatment with additional amounts of alkali methoxide will convert an N-acyl ($R_1$=acyl) into the free amine ($R_1$=H) dialkali metal salt from which the dihydrogen phosphate can be obtained by contacting with ion exchange resin. (Compare Compound 34 of Flow Sheet E.)

The [3,2-c]pyrazolo compounds described in the foregoing structures form salts such as the hydrochloride, sulfate, chlorate, perchlorate, picrate and trichloroacetate, on treatment with the corresponding acid.

A further embodiment of our invention comprises novel pharmaceutical compositions containing the novel [3,2-c] pyrazole compounds exemplified in the foregoing structures.

FLOW SHEET A

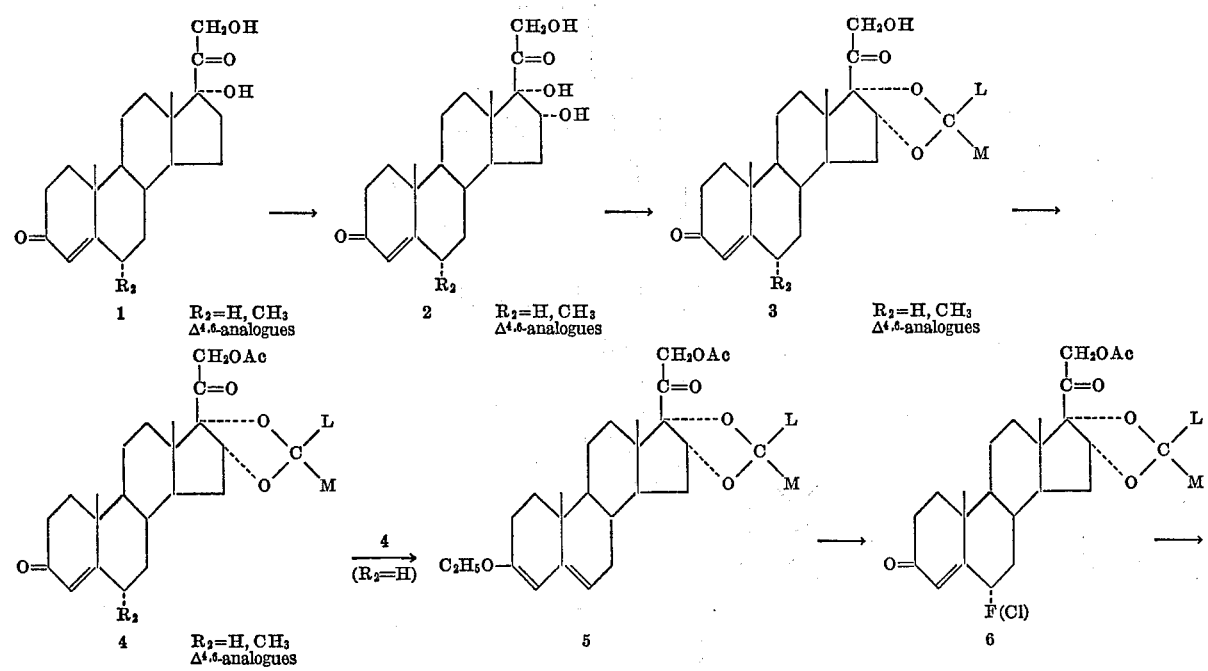

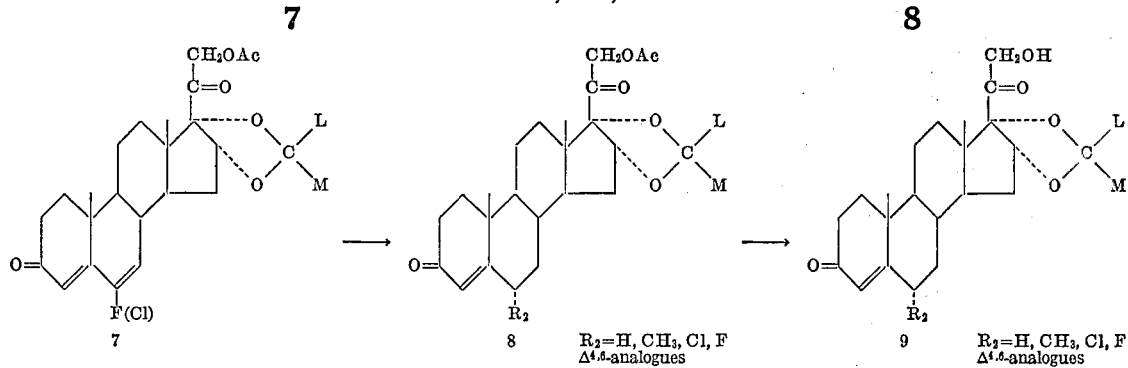
wherein L and M are each selected from the group consisting of hydrogen, alkyl and aryl, and together with the carbon to which they are joined, L and M are cycloalkyl.
FLOW SHEET B
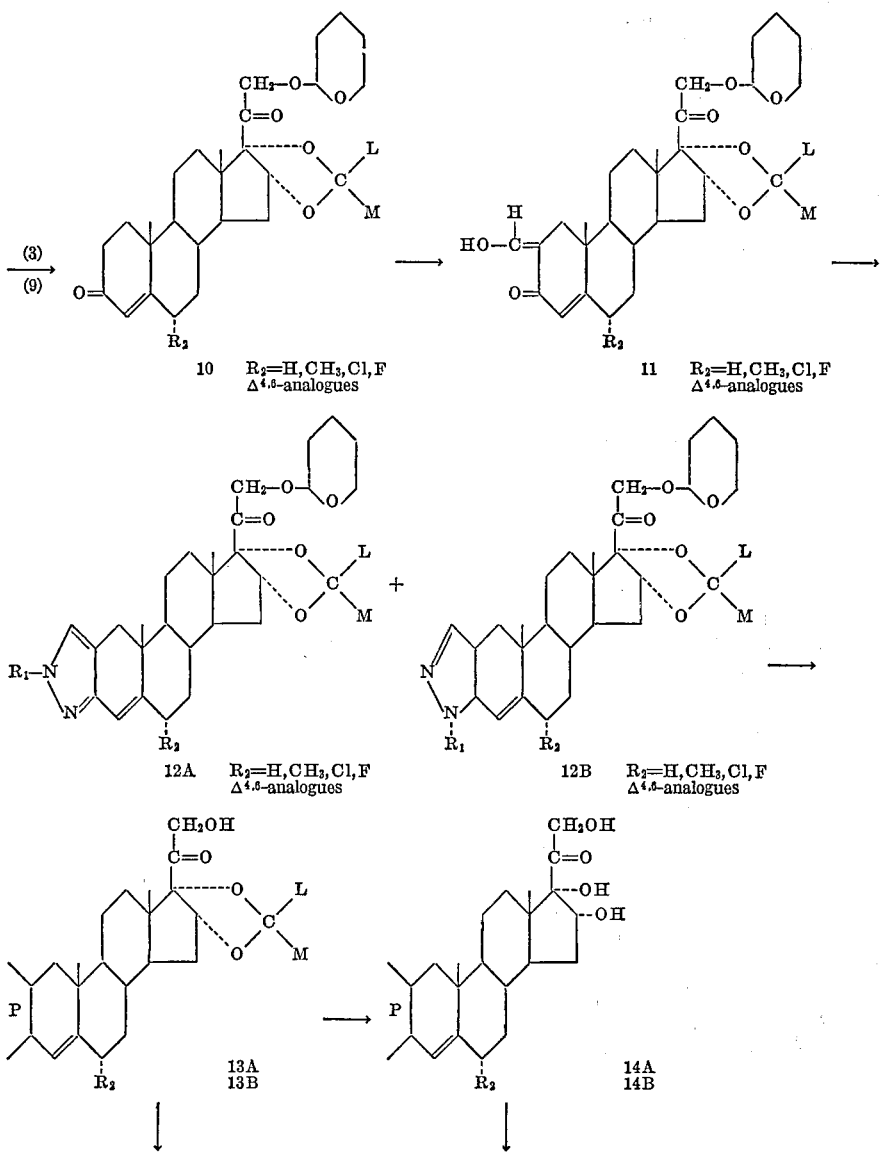

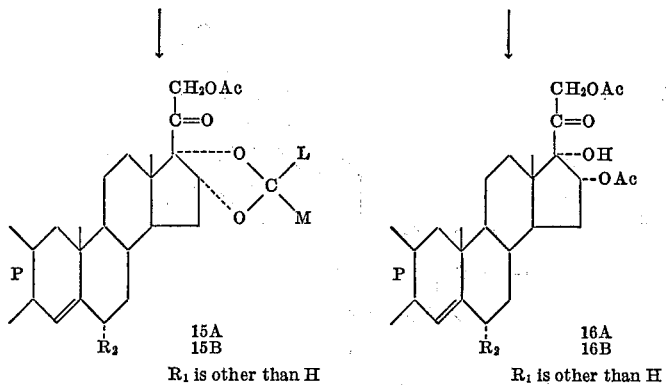

wherein $R_1$ is a member of the group consisting of hydrogen, alkyl, aralkyl, cycloalkyl, aryl, a heterocyclic nucleus, and substituted derivatives thereof; $R_2$ is a member of the group consisting of hydrogen, methyl, chloro and fluoro. L and M are each selected from the group consisting of hydrogen, alkyl and aryl, and together with the carbon to which they are joined, L and M are cycloalkyl. P stands for the pyrazole ring, the structure of the pyrazole ring in the "A" compounds being the same as that of compound 12A, and the structure of the pyrazole ring in the "B" compounds being the same as that of compound 12B.

FLOW SHEET C

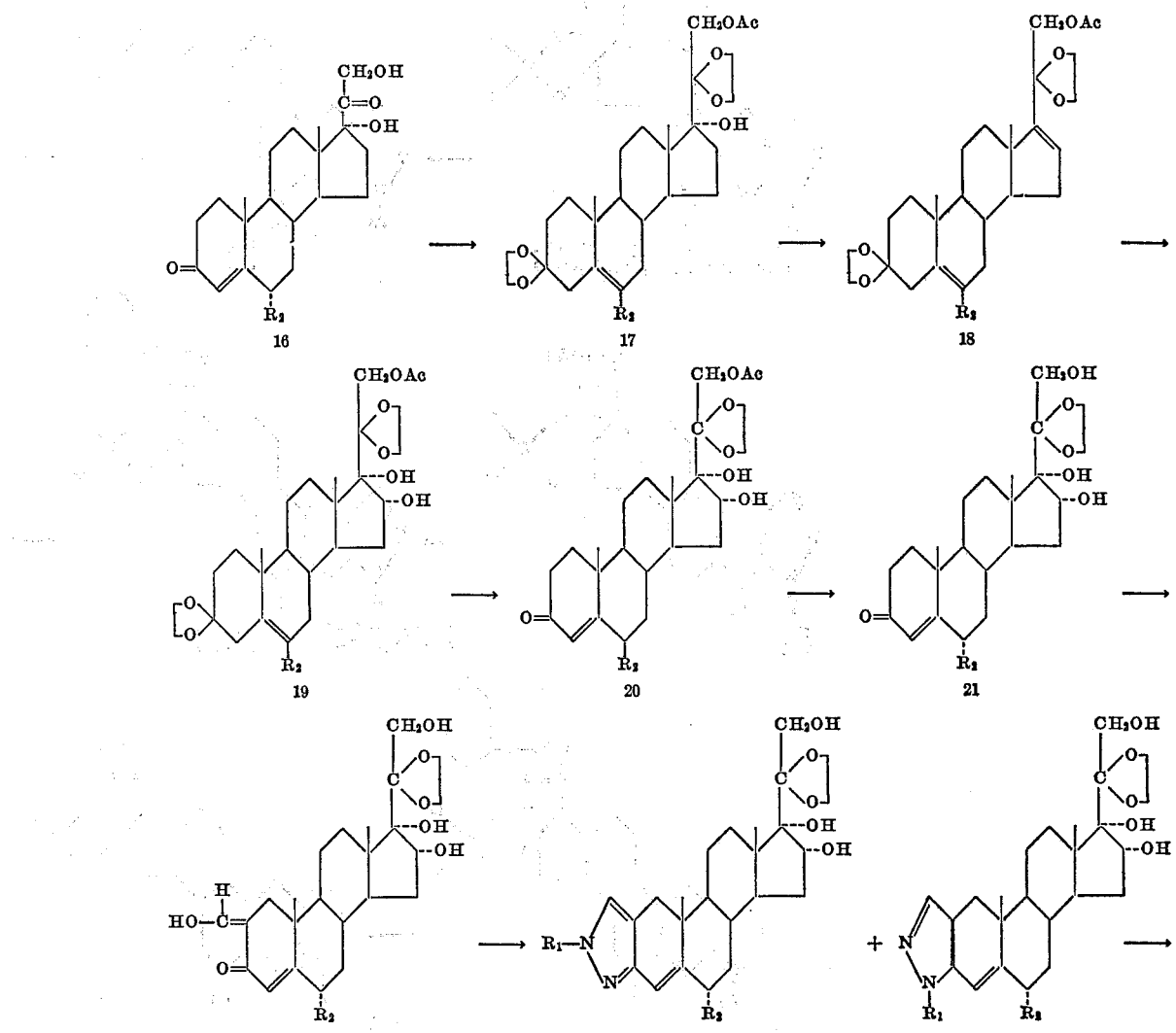

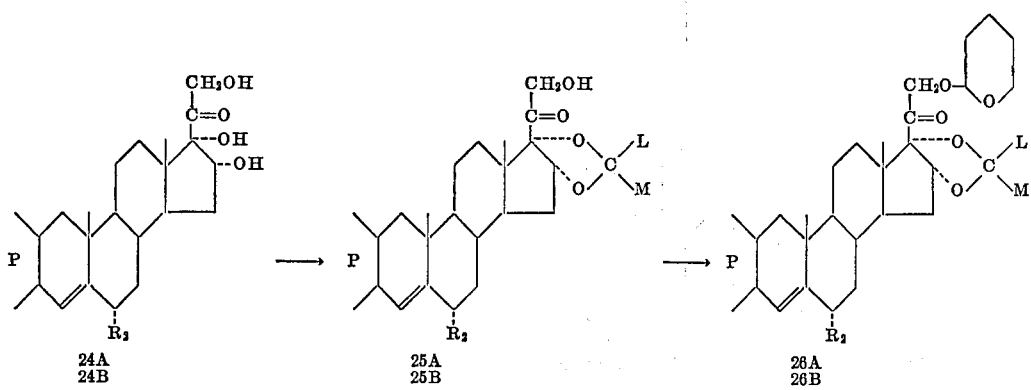

wherein $R_1$ is a member of the group consisting of hydrogen, alkyl, aralkyl, cycloalkyl, aryl, a heterocyclic nucleus, and substituted derivatives thereof; $R_2$ is a member of the group consisting of hydrogen, methyl, chloro and fluoro and compounds 24–26 include the $\Delta^{4,6}$-analogues of the compounds shown. In compounds 25 and 26 L and M are each selected from the group consisting of hydrogen, alkyl and aryl, and together with the carbon to which they are joined, L and M are cycloalkyl. In all structures following compounds 23A and 23B P stands for the pyrazole ring, the structure of the pyrazole ring in the "A" compounds being the same as that of compound 23A, and the structure of the pyrazole ring in the "B" compounds being the same as that of compound 23B.

FLOW SHEET D (ACYL DERIVATIVES)

(21-acyl and N-acyl derivatives when $R_1$ is H)

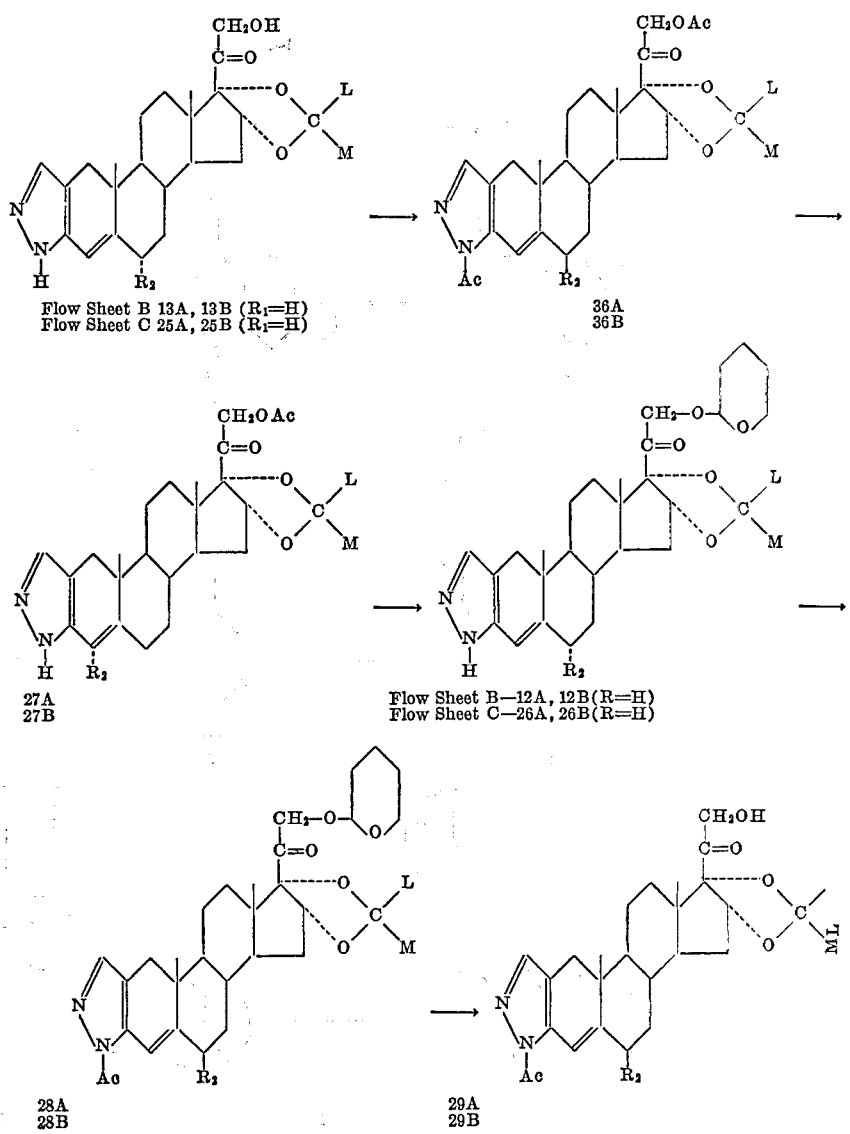

wherein $R_2$ is a member of the group consisting of hydrogen, methyl, chloro and fluoro; L and M are each selected from the group consisting of hydrogen, alkyl and aryl and together with the carbon to which they are joined L and M are cycloalkyl.

Although the above transformations are shown with compounds in which the pyrazole ring has the "B" structure, the same transformations take place with compounds in which the pyrazole ring has the "A" structure as exemplified in Flow Sheet A, compound 12A and in Flow Sheet B, compound 23A.

The compounds also include the $\Delta^{4,6}$-analogues of the structures shown.

ber of the group consisting of hydrogen, methyl, chloro and fluoro; L and M are each selected from the group consisting of hydrogen, alkyl and aryl, and together with the carbon to which they are joined, L and M are cycloalkyl. In all structures "P" stands for the pyrazole ring, the structure of the pyrazole ring in the "A" compounds being the same as that of compound 12A, and the structure of the pyrazole ring in the "B" compounds being the same as that of compound 12B.

The compounds also include the $\Delta^{4,6}$-analogues of the compounds shown.

The following examples illustrate methods of carrying out the present invention but it is to be understood that these examples are given for purposes of illustration and not of limitation.

FLOW SHEET E

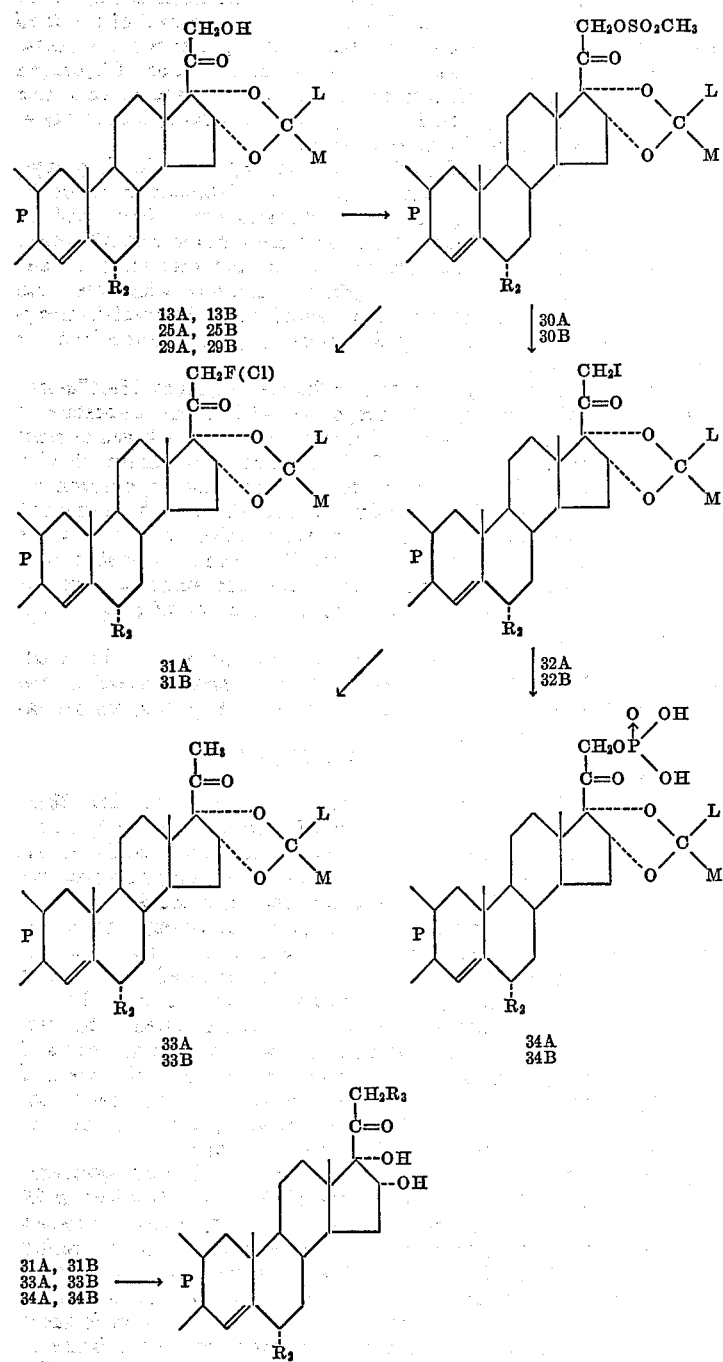

wherein $R_1$ is a member of the group consisting of hydrogen, alkyl, aralkyl, cycloalkyl, aryl, a heterocyclic nucleus, and substituted derivatives thereof; $R_2$ is a mem-

EXAMPLE 1

A fermentation medium consisting of (per liter): starch 40 g.; corn steep liquor, 25 g.; calcium carbonate, 5 g.;

lard oil, 0.2 percent by volume; dibasic potassium phosphate, 5 g.; is inoculated with a 24 hour vegetated growth of *S. roseochromogenes* strain Waksman 3689 grown in a seed medium consisting of (per liter): sucrose, 30 g.; corn steep liquor, 20 g.; calcium carbonate, 5 g.; and ammonium sulfate, 2 g.; All incubations are carried out at 26.5° C. on a shaker. After a 24 hour aeration a solution of 17α,21-dihydroxy-4-pregnene-3,20-dione in dimethyl formamide is added to the fermentation flasks in such a way that the final dimethyl formamide concentration does not exceed 2 percent per volume and the final steroid concentration is 250 mg. per liter. The fermentation is allowed to proceed until most of the material has been converted, as judged from paper strip analysis. The broth is filtered, extracted with ethyl acetate and concentrated.

The 16α,17α,21-trihydroxy-4-pregnene-3,20-dione is recovered by partition chromatography.

The 16α,17α,21-trihydroxy-4-pregnene-3,20-dione (100 mg.) is heated for 3 minutes with 10 ml. of acetone to which 1 drop of concentrated hydrochloric acid has been added and then letting stand at room temperature for 24 hours. The mixture is then poured into a dilute sodium bicarbonate solution and extracted with ethyl acetate. The extracts are washed, dried over magnesium sulfate and taken to dryness to give the 21-hydroxy-16α,17α-isopropylidenedioxy-4-pregnene-3,20-dione.

In accordance with the above procedure, but using an equivalent quantity of another aldehyde or ketone, there is obtained the corresponding 16α,17α-acetal or ketal.

To a solution of 100 mg. of 21-hydroxy-16α,17α-isopropylidenedioxy-4-pregnene-3,20-dione in 0.7 ml. of pyridine is added 0.6 ml. of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The product is then crystallized from a solvent; alternately, the product may be chromatographed on alumina and the 21hydroxy-16α,17α-isopropylidenedioxy-4-pregnene-3,20-dione 21-acetate is isolated by crystallization of the appropriate eluate.

In accordance with the above procedures, but starting with the 6α-methyl derivative or the Δ$^{4,6}$-analogues thereof, of the 17α,21-dihydroxy-4-pregnene-3,20-dione there is obtained the corresponding 21 acetoxy-16α,17α-isopropylidenedioxy-6α-methyl-4-pregnene-3,20-dione, the 21-hydroxy-16α,17α-isopropylidenedioxy-4,6-pregnadiene-3,20-dione, or the 21-hydroxy-6-methyl-16α,17α-isopropylidenedioxy-4,6-pregnadiene-3,20-dione respectively.

EXAMPLE 2

A mixture of two grams of 21-hydroxy-16α,17α-isopropylidenedioxy-4-pregnene-3,20-dione 21-acetate, 15 ml. dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give the 3 enol ethyl ether of 21-hydroxy-16α,17α-isopropylidenedioxy-4-pregnene-3,20-dione 21-acetate.

Two hundred and fifty milligrams of the above product is dissolved in 5 ml. of dry pyridine. The mixture is cooled to −20° C. and perchloryl fluoride is bubbled through slowly for three minutes. It is then poured into ice and water and extracted several times with ethyl acetate. The organic layer is washed first with dilute hydrochloric acid and then with 5% sodium bicarbonate, and then dried. The residue, after removal of solvent, is allowed to stand over night at room temperature with about 5 cc. of a saturated solution of hydrogen chloride in chloroform. The chloroform is removed to give the 6α-fluoro-21-hydroxy-16α,17α-isopropylidenedioxy - 4 - pregnene-3,20-dione 21-acetate.

Three hundred and eighty-five milligrams of the crude 3-enol ethyl ether of 21-hydroxy-16α,17α-isopropylidenedioxy-4-pregnene-3,20-dione 21-acetate is dissolved in 10 ml. of acetone containing 0.17 g. of sodium acetate dissolved in 1.7 ml. of water and the mixture is cooled to 0° C. N-chlorosuccinimide (170 mg.) is added, immediately followed by 0.17 ml. of glacial acetic acid. The reaction mixture is stirred in the ice bath for one and one-half hours and is then poured into ice water and extracted into ethyl acetate. The residue after removal of the dried solvent is allowed to stand over night at room temperature with about 5 cc. of a saturated solution of hydrogen chloride in chloroform. The chloroform is removed to give the 6α-chloro-21-hydroxy-16α,17α-isopropylidenedioxy-4-pregnene-3,20-dione 21-acetate.

100 mg. of 6α-fluoro-21-hydroxy - 16α,17α - isopropylidenedioxy-4-pregnene-3,20-dione 21-acetate, 5 cc. of dioxane, 50 mg. of dicyanodichlorobenzoquinone and 10 mg. of p-toluenesulfonic acid are refluxed under nitrogen over night. The product is extracted with ethyl acetate, washed with sodium hydroxide and then with water, and then taken to dryness to afford the 6-fluoro-21-hydroxy-16α,17α - isopropylidenedioxy-4,6-pregnadiene-3,20-dione 21-acetate.

A 500 mg. aliquot of 6-fluoro-21-hydroxy-16α,17α-propylidenedioxy - 4,6 - pregnadiene-3,20-dione 21-acetate is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 21-hydroxy - 16α,17α-isopropylidenedioxy-4,6-pregnadiene-3,20-dione.

In accordance with the last two procedures, but starting with the 6-chloro starting materials instead of the 6-fluoro compounds, the corresponding 6-chloro-derivatives are obtained.

EXAMPLE 3

The following procedures which relate to Flow Sheet B are particularly described starting with 21-hydroxy-16α,17α-isopropylidenedioxy - 4 - pregnene-3,20-dione, but are generally applicable to all the starting materials defined in Flow Sheet A compounds 3, 7 and 9.

21 - hydroxy-16α,17α-isopropylidenedioxy-4-pregnene-3,20-dione (500 mg.) is suspended in 25 ml. of 2,3-dihydropyran. A few drops of concentrated hydrochloric acid are added and magnetic stirring is continued for 6 hours, whereupon the solution is concentrated under vacuum. The residue is triturated with petroleum ether and recrystallized from a mixture of methylene chloride and petroleum ether or a mixture of ether and petroleum ether, to afford the 21 - tetrahydropyranyloxy-16α,17α-isopropylidenedioxy-4-pregnene-3,20-dione.

The 21 - tetrahydropyranyloxy-16α,17α-isopropylidenedioxy-4-pregnene-3,20-dione (350 mg.) is dissolved in 25 ml. of dry, hot benzene and the resulting solution is cooled to room temperature and treated with 1.0 ml. of freshly distilled ethyl formate. The air in the system is replaced with nitrogen and 560 mg. of sodium hydride (as a 58% dispersion in mineral oil) is added. The system is again evacuated and filled with nitrogen, and the mixture is stirred magnetically at room temperature over night. The mixture is poured into an excess of a saturated aqueous solution of sodium dihydrogen phosphate and the product is extracted four times with benzene. The organic extracts are washed three times with water and dried over sodium sulfate. Removal of the solvent gives the crude product which is dissolved in ether and purified as the sodium salt by extraction into a 10% solution of sodium carbonate. The aqueous alkaline extracts are again acidified with an excess of a saturated aqueous solution of sodium dihydrogen phosphate and extracted into ether and into chloroform. The combined organic extracts are dried over sodium sulfate and evaporated to dryness to give 21 - tetrahydropyranyloxy - 2 - hydroxymethylene-16α,17α-isopropylidenedioxy-4-pregnene-3,20-dione, and/or the formate esters thereof.

The 21 - tetrahydropyranyloxy - 2 - hydroxymethylene-16α,17α-isopropylidenedioxy-pregnene-3,20-dione, and/or the formate esters thereof, (565 mg.) is dissolved in 9.0 ml. of absolute ethanol and treated with a solution of hydrazine hydrate (60 mg., 1.2 equivalents) dissolved in 1.0 ml. of absolute ethanol. The mixture is refluxed in a nitrogen atmosphere for about 3 hours and then evaporated to dryness under reduced pressure. The residue is washed three times with cold water and the resulting amorphous solid is dried at 80° C. for 1 hour in high vacuum. It is redissolved in 30 ml. of methanol and 5 ml. of sodium methoxide in methanol and left under nitrogen for 10 minutes. The alkoxide is neutralized with the acetic acid and the mixture is diluted with ethyl acetate and washed with water. Removal of the dried solvent leaves 21-tetrahydropyranyloxy - 16α,17α - isopropylidenedioxy-20-oxo-4-pregnene-[3,2-c]pyrazole.

To a solution of 0.5 millimoles of 21 - tetrahydropyranyloxy - 2 - hydroxymethylene - 16α,17α-isopropylidenedioxy-4-pregnene - 3,20 - dione, and/or the formate esters thereof, in about 3 ml. of absolute ethanol is added 0.6 millimoles of sodium acetate and then 0.6 millimoles of methylhydrazine sulfate. The mixture is refluxed under nitrogen for 40 minutes and then filtered hot. The filtrate is taken to dryness. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves predominantly the 1'-methyl-21-tetrahydropyranyloxy - 16α,17α - isopropylidenedioxy-20-oxo-4-pregeno-[3,2-c]pyrazole.

A mixture of 565 mg. of 21-tetrahydro-pyranyloxy-2-hydroxymethylene-16α,17α-isopropylidenedioxy - 4 - pregnene-3,20-dione and/or the formate esters thereof, and 130 mg. (1.2 equivalents) of phenylhydrazine are refluxed under nitrogen in 8 ml. of absolute ethanol for about three hours. The reaction mixture is taken to dryness. Water is added and the product is filtered to give an amorphous solid, which is washed successively with water, dilute acid, water, and petroleum ether. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 2' - phenyl - 21 - tetrahydropyranyloxy - 16α,17α-propylidenedioxy-20-oxo-4-pregneno-[3,2-c]pyrazole.

A mixture of the 1'-phenyl- and 2'-phenyl-21 tetrahydropyranyloxy-16α,17α-propylidenedioxy - 20 - oxo-4-pregneno-[3,2-c]pyrazole is prepared by the following route: One gram of 21-tetrahydropyranyloxy-2-hydroxymethylene-16α,17α - isopropylidenedioxy - 4 - pregnene-3,20-dione, and/or the formate esters thereof, in 50 ml. of dry dioxane is treated with excess ethereal diazomethane for one hour. The reaction mixture is taken to near dryness under vacuum, ethyl acetate is added and the organic layer is washed two times with 2 N aqueous sodium hydroxide solution and then with water. The ethyl acetate extract is then dried and concentrated under vacuum. The 21 - tetrahydro-pyranyloxy-2-methoxymethylene-16α,17α-isopropylidenedioxy-4-pregnene-3,20-dione is obtained by chromatography on silica gel.

A mixture of 580 mg. of the above 2-methoxymethylene-steroid, 10 ml. of ethanol and 130 mg. (1.2 equivalents) of phenylhydrazine is heated under nitrogen until dissolved, and then allowed to stand under nitrogen at room temperature overnight. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on silica gel or Florisil to yield the 1'-phenyl- and the 2'-phenyl-21-tetrahydropyranyloxy - 16α,17α - isopropylidenedioxy-20-oxo-4-pregneno-[3,2-c]pyrazole.

A 565 mg. sample of 21-tetrahydropyranyloxy-2-hydroxymethylene - 16α,17α - isopropylidenedioxy - 4 - pregnene-3,20-dione and/or the formate esters thereof is suspended in 10 ml. of ethanol and treated with 100 mg. (1.2 equivalents) of sodium acetate, followed with the addition of 195 mg. (1.2 equivalents) of p-fluorophenylhydrazine hydrochloride. The air in the systems is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness under vacuum. It is redissolved in 50 ml. of methanol and 10 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 2'-(p-fluorophenyl)-21-tetrahydropyranyloxy - 16α,17α - isopropylidenedioxy - 20 - oxo-4-pregneno-[3,2-c]pyrazole.

A mixture of 1'-(p-fluorophenyl)- and 2'-(p-fluorophenyl) - 21 - tetrahydropyranyloxy - 16α,17α - isopropylidenedioxy-20-oxo - 4 - pregneno-[3,2-c]pyrazole is prepared by the following route: one gram of 21-tetrahydropyranyloxy-2-hydroxymethylene - 16α,17α - isopropylidenedioxy-4-pregnene - 3,20 - dione, and/or the formate esters thereof, in 50 ml. of dry dioxane is treated with excess ethereal diazomethane for one hour. The reaction mixture is taken to near dryness under vacuum, ethyl acetate is added and the organic layer is washed two times with 2 N aqueous sodium hydroxide solution and then with water. The ethyl acetate extract is then dried and concentrated under vacuum. The 21-tetrahydropyranyloxy - 2 - methoxymethylene - 16α,17α - isopropylidenedioxy-4-pregnene-3,20-dione is obtained by chromatography on neutral alumina.

A mixture of 500 mg. of the 2-methoxymethylene-dedivatives, 100 ml. of ethanol, and 1 ml. of p-fluorophenylhydrazine is heated under nitrogen until dissolved, and then allowed to stand under nitrogen at room temperature overnight. The reaction mixture is then diluted with ethyl acetate, washed two times with 2 N-sulfuric acid, two times with 2.5 N sodium hydroxide, and then two times with water. The ethyl acetate extracts are then dried, concentrated, and chromatographed on neutral alumina to afford the 1'-(p-fluorophenyl)-and the 2'-(p-fluorophenyl) - 21 - tetrahydropyranyloxy - 16α,17α - isopropylidenedioxy-20-oxo-4-pregneno-[3,2-c]pyrazole.

In accordance with the above procedure, but using each of the monosubstituted hydrazines listed in col. 3, there is obtained the corresponding 1'- and 2'-substituted derivatives of the above 21-tetrahydropyranyloxy-16α,17α-isopropylidenedioxy-20-oxo-4-pregneno-[3,2-c]pyrazoles.

The 21-tetrahydropyranyloxy-16α,-17α-isopropylidenedioxy-20-oxo-4-pregneno-[3,2-c]pyrazole (40.0 mg.) is dissolved in 0.5 ml. of methanol and treated with 1.82 ml. of a solution of 500 mg. of p-toluenesulfonic acid monohydrate in 25 ml. of methanol. The mixture is kept at room temperaurte for 4 hours. The solvent is removed under vacuum and the residue treated with 3 ml. of ethyl acetate. The insoluble material is filtered off and the organic layer is washed twice with 2 ml. of 10% sodium bicarbonate and twice with 2 ml. of water. The product is dried over magnesium sulfate, filtered and the solvent removed on a steam bath. The residue is slurried with a small amount of methylene chloride, and the slurry is filtered and dried under vacuum to give 23.0 mg. of 21-hydroxy-16α,17α-isopropylidenedioxy-20-oxo-4-pregneno-[3,2-c]pyrazole.

21 - hydroxy - 16α,17α - isopropylidenedioxy-20-oxo-4-pregneno-[3,2-c]pyrazole (1.5 g.) is added to 150 ml. of refluxing 60% formic acid. After twenty minutes, the solution is cooled and then poured into ice and water. After 18 hours, the 16α,17α,21-trihydroxy-20-oxo-4-pregneno-[3,2-c]pyrazole is collected by filtration and dried.

To a solution of 100 mg. of 21-hydroxy-2'-phenyl-16α,17α - isopropylidenedioxy-20-oxo-4-pregneno-[3,2-c]pyrazole in 2 ml. of pyridine is added 0.5 ml. of acetic anhydride. The mixture is allowed to stand overnight at room temperature. A mixture of ice and water is then added. After standing for about 30 minutes the product is extracted with ethyl acetate. The ethyl acetate extract is washed successively with water, ice-cold 1 N sulfuric acid (until the pH of the aqueous layer is 1–3) unsaturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The product is then crystallized from a solvent; alternately, the product may be chromatographed on alumina and the 21-hydroxy-16α,17α-isopropylidenedioxy - 20 - oxo-2'-phenyl-4-pregneno-[3,2-c]pyrazole 21-acetate is isolated by crystallization of the appropriate eluate.

To a solution of 100 mg. of 16α,17α,21-trihydroxy-20-oxo-2'-phenyl-4-pregneno-[3,2-c]pyrazole in 0.7 ml. of pyridine is added 0.6 ml. of acetic anhydride. The mixture is allowed to stand overnight at room temperature. A mixture of ice and water is then added. After standing for about 30 minutes, the product is extracted with ethyl acetate. The ethyl acetate extract is washed successively with water, ice-cold 1 N sulfuric acid (until the pH of the aqueous layer is 1–3), saturated aqueous sodium bicarbonate (until the pH of the aqueous layer is 8), and water (until the aqueous layer is neutral). The ethyl acetate solution is dried with anhydrous sodium sulfate. The solvent is then distilled at about 40° C. under vacuum. The product is then crystallized from a solvent; alternately the product may be chromatographed on alumina and the 16α,21 - diacetoxy-17α-hydroxy-20-oxo-2'-phenyl-4-pregneno-[3,2-c]pyrazole is isolated by crystallization of the appropriate eluate.

In accordance with all of the above procedures, but starting with the 21-hydroxy-16α,17α-isopropylidenedioxy-6α-methyl-4-pregneno-3,20-dione there are obtained as products the 2'-phenyl- and 2'-(p-fluorophenyl)-derivatives of 21-hydroxy-16α,17α-isopropylidenedioxy-6α-methyl-20-oxo-4-pregneno-[3,2-c]pyrazole, the 21-hydroxy - 16α,17α-isopropylidenedioxy-6α-methyl-20-oxo-4-pregneno-[3,2-c]pyrazole 21-acetate; 16α,17α,21-trihydroxy-6α-methyl-20-oxo-4-pregneno-[3,2-c]pyrazole and the 16α,21-diacetoxy-6α-methyl-20-oxo-4-pregneno-[3,2-c]pyrazole.

In accordance with all of the above procedures but starting with the 21-hydroxy-16α,17α-isopropylidenedioxy-4,6-pregnadiene-3,20-dione there are obtained as products the 2'-phenyl- and 2'-(p-fluorophenyl)-derivatives of 21 - hydroxy-16α,17α-isopropylidenedioxy-20-oxo-4,6-pregnadieno-[3,2-c]pyrazole; the 21-hydroxy-16α,17α-isopropylidenedioxy - 20 - oxo-4,6-pregnadieno-[3,2-c]pyrazole; the 21-hydroxy-16α,17α-isopropylidenedioxy-20-oxo-4,6-pregnadieno-[3,2-c]pyrazole 21-acetate; and 16α,17α,21-trihydroxy-20-oxo-4,6-pregnadiene-[3,2-c]pyrazole.

In accordance with all of the above procedures but starting with the 6-fluoro-21-hydroxy-16α,17α-isopropylidene- dioxy-4,6-pregnadiene-3,20-dione there are obtained as products the 2'-phenyl- and 2'-(p-fluorophenyl)-derivatives of 6-fluoro-21-hydroxy-16α,17α-isopropylidenedioxy-20-oxo-4,6-pregnadiene-[3,2-c]pyrazole; the 6-fluoro-21-hydroxy - 16α,17α - isopropylidenedioxy-20-oxo-4,6-pregnadieno-[3,2-c]pyrazole; the 6-fluoro-21-hydroxy-16α,17α - isopropylidenedioxy - 20-oxo-4,6-pregnadieno-[3,2-c]pyrazole 21-acetate; and the 6-fluoro-16α,17α,21-trihydroxy-20-oxo-4,6-pregnadieno-[3,2-c]pyrazole.

In accordance with all of the above procedures but starting with the 21-hydroxy-16α,17α-isopropylidenedioxy-6-methyl-4,6-pregnadiene-3,20-dione there are obtained as products the 2'-phenyl and 2'-(p-fluorophenyl)-derivatives of 21-hydroxy-16α,17α-isopropylidenedioxy-6-methyl-20-oxo-4,6-pregnadieno-[3,2-c]pyrazole; the 21-hydroxy - 16α,17α-isopropylidenedioxy-6-methyl-20-oxo-4,6-pregnadieno-[3,2-c]pyrazole; the 21-hydroxy-16α,17α-isopropylidenedioxy - 6-methyl-20-oxo-4,6-pregnadieno-[3,2-c]pyrazole 21-acetate; and the 16α,17α,21-trihydroxy-6-methyl-20-oxo-4,6-pregnadieno-[3,2-c]pyrazole.

EXAMPLE 4

The following procedures which relate to Flow Sheet C are particularly described starting with the 17α,21-dihydroxy - 4 - pregnene - 3,20 - dione, but are generally applicable to all of the starting materials defined by Flow Sheet C.

A mixture of 500 mg. of 17α, 21 - dihydroxy - 4-pregnene - 3,20 - dione, 4 ml. of ethylene glycol, 25 ml. of benzene and 25 mg. of p - toluenesulfonic acid monohydrate is refluxed in a Dean-Stark water separator for 8 hours. The reaction mixture is then cooled and some pyridine and ethyl acetate are added. After extraction with dilute sodium bicarbonate, the organic layers are dried and removed under vacuum. The entire crude material is dissolved in 2 ml. of pyridine and 2 ml. of acetic anhydride, and then left overnight at room temperature. The reaction mixture is then taken to dryness on a rotating evaporator at the oil pump. The residue is dissolved in ethyl acetate and washed with dilute sodium bicarbonate. The ethyl acetate layer is then dried and the ethyl acetate is removed under vacuum. Chromatography on basic alumina affords 3ξ,20 - bis(ethylenedioxy)-17α, 21-dihydroxy-5-pregnene 21-acetate.

Thionyl chloride (0.45 ml.) is added dropwise to a magnetically stirred solution of 850 mg. of 3ξ,20 - bis(ethylenedioxy) - 17α,21 - dihydroxy - 5 - pregnene 21-acetate in 5 ml. of pyridine at −5° C. After 18 hours at this temperature the reaction mixture is poured into a stirred iced sodium bicarbonate solution. The product is extracted into chloroform and the chloroform layer is then dried and removed. Chromatography over basic alumina affords the 3ξ,20 - bis(ethylenedioxy) - 21 - hydroxy - 5,16 - pregnadiene 21 - acetate.

A solution of 266 mg. of osmium tetroxide in 5 ml. of benzene is added dropwise to a stirred solution of 465 mg. of 3ξ,20 - bis(ethylenedioxy) - 21 - hydroxy - 5,16-pregnadiene - 21 - acetate in 10 ml. of benzene and 0.3 ml. of pyridine. After one hour, there is added 12 ml. of methanol and then a solution of 1.3 g. of sodium sulfite and 1.3 g. of potassium bicarbonate in 18 ml. of water. This mixture is stirred vigorously for three hours and then filtered. The red-brown solid which is collected is extracted exhaustively with hot ethyl acetate. The combined organic layers are washed with water and taken to dryness. Crystallization from methanol affords 3ξ,20-bis(ethylenedioxy) - 16α,17α,21 - trihydroxy - 5 - pregnene 21 - acetate.

A solution of 150 mg. of 3ξ,20 - bis(ethylenedioxy)-16α,17α,21 - trihydroxy - 5 - pregnene 21-acetate in 3 ml. of glacial acetic acid is heated on the steam bath for twenty minutes. It is then poured into ice and water and extracted into chloroform. The organic layer is washed with aqueous sodium bicarbonate until all of the acid has been removed. Evaporation of the dried chloroform layer leaves a residue which is chromatographed over basic alumina to yield a fraction which after crystallization from methanol is 20 - ethylenedioxy - 16α,17α,21-trihydroxy - 4 - pregnene - 3-one 21-acetate.

A 500 mg. aliquot of the above product is dissolved in 2.4 ml. of pure methanol and allowed to react with 0.9 ml. of a 1.33 N solution of sodium methoxide in methanol at room temperature under a nitrogen atmosphere for ten minutes. The alkoxide is neutralized with acetic acid and the mixture is then taken to dryness and flushed with n-hexane. The residue is washed with water, filtered and dried to constant weight to give 20-ethylenedioxy-16α,17α,21-trihydroxy-4-pregnene-3-one.

A suspension of 610 mg. of 20 - ethylenedioxy - 16α,17α,21 - trihydroxy - 4 - pregnene - 3 - one in 50 ml. of dry benzene is stirred in a nitrogen atmosphere with 1 ml. of ethyl formate and 450 mg. of a suspension of about 54% sodium hydride in mineral oil at room temperature for 19 hours. Then an additional 1 ml. of ethyl formate and 350 mg. of sodium hydride is added. After two hours, the reaction mixture is chilled in an ice bath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness to give 20 - ethylenedioxy - 16α,17α,21 - trihydroxy - 2 - hydroxymethylene - 4 - pregnene - 3 - one, and/or formate esters thereof.

A 25 mg. aliquot of 20 - ethylenedioxy 16α,17α,21-trihydroxy - 2 - hydroxymethylene - 4 - pregnene - 3-one, and/or the formate esters thereof, is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed under vacuum and the residue is extracted with hot methylene chloride. The methylene chloride solution is filtered to remove insolubles and taken to dryness. It is redissolved in 3 ml. of methanol and 0.5 ml. of sodium methoxide in methanol and left under nitrogen for 10 minutes. The alkoxide is neutralized with acetic acid and the mixture is diluted with ethyl acetate and washed with water. Removal of the dried solvent leaves 20 - ethylenedioxy - 16α,17α,21 - trihydroxy - 4 - pregnene - [3,2-c] pyrazole.

A mixture of the 1'-methyl- and 2'-methyl-20-ethylenedioxy - 16α,17α,21 - trihydroxy-4-pregneno-[3,2-c]pyrazole is prepared by the following route: a mixture of 1 gram of 20-ethylenedioxy-16α,17α,21-trihydroxy - 2 - hydroxymethylene-4-pregnene-3-one, and/or the formate esters thereof, 200 ml. of methanol, and 200 mg. of p-toluenesulfonic acid is allowed to stand at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum to give the desired 20-ethylenedioxy-16α,17α,21-trihydroxy-2-methoxymethylene-4-pregnene-3-one.

A mixture of 500 mg. of the above 2-methoxymethylene-derivative, 100 ml. of ethanol, and 1 ml. of methylhydrazine is heated under nitrogen until dissolved, and then allowed to stand under nitrogen at room temperature overnight. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on Florisil or silica gel to yield the 1'-methyl and the 2'-methyl-20-ethylenedioxy - 16α,17α,21 - trihydroxy - 4 - pregneno-[3,2-c]pyrazole.

A mixture of 90 mg. of 20-ethylenedioxy-16α,17α,21-trihydroxy-2-hydroxymethylene-4-pregnene-3-one, and its derived formates, and 0.028 mg. of phenylhydrazine is refluxed under nitrogen in 1.2 ml. of absolute ethanol for about 50 minutes. The reaction mixture is taken to dryness. Water is added and the product is filtered to give an amorphous solid. It is redissolved in 8 ml. of methanol and 2 ml. of 1 N sodium methoxide in methanol and left under nitrogen for 10 minutes. The alkoxide is neutralized with acetic acid and the mixture is diluted with ethyl acetate and washed with water. Removal of the dried solvent leaves 2'-phenyl-20-ethylenedioxy-16α,17α,21-trihydroxy-4-pregneno-[3,2-c]pyrazole.

A mixture of the 1'-phenyl- and 2'-phenyl-20-ethylenedioxy - 16α,17α,21-trihydroxy-4-pregneno-[3,2-c]pyrazole is prepared by the following route: A mixture of 1 gram of 20 - ethylenedioxy-16α,17α,21-trihydroxy-2-hydroxymethylene-4-pregnene-3-one, and its derived formates, 200 ml. of methanol, and 200 mg. of p-toluenesulfonic acid is allowed to stand at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 20-ethylenedioxy-16α,17α,21-trihydroxy - 2 - methoxymethylene-4-pregene-3-one is obtained by chromatography on acid-washed alumina and elution with ether:chloroform mixtures.

A mixture of 500 mg. of the above 2-methoxymethylene-steroid, 100 ml. of ethanol, and 1 ml. of phenylhydrazine is heated under nitrogen until dissolved, and then allowed to stand under nitrogen at room temperature over-night. The reaction mixture is then diluted with ethyl acetate, washed two times with 2 N sulfuric acid, two times with 2.5 N sodium hydroxide, and then two times with water. The ethyl acetate extract is then dried, concentrated, and chromatographed on Florisil (an activated magnesium silicate made according to U.S. Pat. 2,393,625) or silica gel to yield the 1'-phenyl and 2'-phenyl-20-ethylenedioxy-16α,17α,21-trihydroxy-4-pregneno-[3,2 - c] pyrazole.

A 111.5 gm. sample of 20-ethylenedioxy-16α,17α,21-trihydroxy-2-hydroxymethylene-4-pregnane-3-one, and/or the formate esters thereof, is suspended in 2.5 ml. of ethanol and treated with 24.5 mg. of sodium acetate, followed by the addition of 48.5 mg. of p-fluorophenylhydrazine hydrochloride. The air in the system is replaced with nitrogen and the mixture is quickly brought to reflux temperature. After refluxing for one hour the mixture is taken to dryness. The residue is dissolved in ether, the ether layer is treated three times with 2.5 N hydrochloric acid, then three times with 2.5 N sodium hydroxide and finally with water. The ether layer is dried over magnesium sulfate, filtered and concentrated to dryness under vacuum. It is redissolved in 12 ml. of methanol and 2.0 ml. of 1.33 N sodium methoxide in methanol and left under nitrogen for 10 minutes. The alkoxide is neutralized with acetic acid and the mixture is diluted with ethyl acetate and washed with water. Removal of the dried solvent leaves 2'-(p-fluorophenyl)-20-ethylenedioxy-16α,17α,21-trihydroxy-4-pregneno-[3,2-c]pyrazole.

A mixture of 1' - (p-fluorophenyl)- and 2'-(p-fluorophenyl) - 20-ethylenedioxy-16α,17α,21-trihydroxy-4-pregneno-[3,2-c]pyrazole is prepared by the following route: A mixture of 1 gram of 20-ethylenedioxy-16α-17α-21-trihydroxy - 2-hydroxymethylene-4-pregnene-3-one, and/or the formate esters thereof, 200 ml. of methanol and 200 mg. of p-toluenesulfonic acid is left at room temperature for two hours. The reaction mixture is then diluted with water and extracted with ethyl acetate. The ethyl acetate extract is washed two times with 2 N aqueous sodium hydroxide solution and then with water. The ethyl acetate extract is then dried and concentrated under vacuum. The 20-ethylenedioxy-16α,17α,21-trihydroxy-2-methoxymethylene-4-pregnene-3-one is obtained by chromatography on acid washed alumina and elution with ether:chloroform mixtures.

A mixture of 500 mg. of the 2-methoxymethylene-derivative, 100 ml. of ethanol, and 1 ml. of p-fluorophenylhydrazine is heated under nitrogen until dissolved, and then allowed to stand under nitrogen at room temperature over night. The reaction mixture is then diluted with ethyl acetate, washed two times with 2 N sulfuric acid, two times with 2.5 N sodium hydroxide, and then two times with water. The ethyl acetate extracts are then dried, concentrated, and chromatographed on acid-washed alumina to afford the 1'-(p-fluorophenyl)- and 2'-(p-fluorophenyl)-20 - ethylenedioxy-16α,17α,21-trihydroxy-4-pregnene-[3,2-c]pyrazole.

In accordance with the above procedures, but using the other substituted hydrazines listed on page 6 in place of phenylhydrazine, there are obtained the corresponding 1' and 2' - substituted-20-ethylenedioxy-16α-17α-21-trihydroxy-4-pregneno-[3,2-c]pyrazoles.

A mixture of 2.9 grams of 20-ethylenedioxy-16α,17α, 21 - trihydroxy-4-pregneno-[3,2-c]pyrazoles, 100 ml. of methanol, and 6 ml. of a solution prepared by diluting 8 ml. of sulfuric acid with 100 ml. of water is refluxed for one hour and then concentrated under vacuum. The product is extracted with ethyl acetate and the extract is washed with aqueous sodium bicarbonate, salt, and then water. The mixture is dried over magnesium sulfate and then taken to dryness to give 16α,17α,21-trihydroxy-20-oxo-4-pregneno-[3,2-c]pyrazole.

The 16,17α,21 - trihydroxy-20-oxo-4-pregneno-[3,2-c]pyrazole (100 mg.) is heated for 3 minutes with 10 ml. of acetone to which 1 drop of concentrated hydrochloric acid has been added and then let stand at room temperature for 24 hours. The mixture is then poured into a dilute sodium bicarbonate solution and extracted with ethyl acetate. The extracts are washed, dried over magnesium sulfate and taken to dryness to give the 21-hydroxy-16α, 17 - isopropylidenedioxy - 20-oxo-4-pregneno-[3,2-c]pyrazole.

In accordance with the above procedure, but using an equivalent quantity of another aldehyde or ketone, there is obtained the corresponding 16α,17α-acetal or ketal.

21 - hydroxy - 16α,17α - isopropylidenedioxy-20-oxo-4-pregneno-[3,2-c]pyrazole (500 mg.) is suspended in 25 ml. of 2,3-dihydropyran. A few drops of concentrated hydrochloric acid are added and magnetic stirring is continued for 6 hours, whereupon the solution is concentrated under vacuum. The residue is triturated with petroleum ether and recrystallized from a mixture of methylene chloride and petroleum ether or a mixture of ether and petroleum ether, to afford the 21-tetrahydropyranyloxy-16α, 17α - isopropylidenedioxy-20-oxo-4-pregneno-[3,2-c]pyrazole.

EXAMPLE 5

The 2-acyl-derivatives of the 21-hydroxy-16α,17α-isopropylidenedioxy - 20-oxo-4-pregneno-[3,2-c]pyrazole are prepared according to the method outlined in Flow Sheet D, using the following procedures which are particularly described with reference to the 21-hydroxy-16α,17α-isopropylidenedioxy - 20-oxo-4-pregneno-[3,2-c]pyrazole, but are generally applicable to all the N-unsubstituted pyrazoles defined by Compounds 13A and 13B of Flow Sheet B and compounds 25A and 25B of Flow Sheet C.

To a solution of 100 mg. of 21-hydroxy-16α,17α-iropropylidenedioxy-20-oxo-4-pregneno-[3,2-c]pyrazole in 2 ml. of pyridine is added 2 ml. of acetic anhydride. The mixture is allowed to stand over night at room temperature. A mixture of ice and water is then added. After standing for about 30 minutes, the product is extracted with ethyl acetate. The ethyl acetate extract is washed successively with water, ice-cold 1 N sulfuric acid, saturated aqueous sodium bicarbonate and water (until the aqueous layer is neutral). The ethyl acetate solution is dried with anhydrous sodium sulfate. The solvent is then distilled at about 40° C. under vacuum, to afford the N-acetyl - 21 - hydroxy-16α,17α-isopropylidenedioxy-20-oxo-4-pregneno-[3,2-c]pyrazole 21-acetate which is isolated by the addition of water and filtration.

In accordance with the above procedures but using an equivalent quantity of another acylating agent in place of acetic anhydride, there is obtained the corresponding acyl derivatives.

A solution of 5.73 g. of N-acetyl-21-hydroxy-16α,17α-isopropylidenedioxy - 20 - oxo - 4 - pregneno - [3,2 - c] pyrazole 21-acetate in 60 ml. of 80% (v./v.) acetic acid is refluxed for 1.5 hours. This solution is diluted with 400 ml. of ice-water and extracted with ethyl acetate. The ethyl acetate extracts are washed with water and with saturated sodium bicarbonate solution, dried, and evaporated to dryness under vacuum. This residue is dissolved in 150 ml. of acetone containing 2 ml. of 70% perchloric acid. After thirty minutes, aqueous sodium bicarbonate is added and the acetone is removed under vacuum. The product is extracted into chloroform which is washed with water, dried and removed to yield, after chromatography on neutral alumina, 2-hydroxy-16α,17α-isopropylidenedioxy - 20 - oxo - 4 - pregneno - [3,2-c]pyrazole 21-acetate.

EXAMPLE 6

The N-acyl-derivatives of the 21-hydroxy-16α,17α-isopropylidenedioxy - 20 - oxo - 4 - pregneno - [3,2 - c] pyrazoles are prepared according to the method outlined in Flow Sheet D, using the following procedures which are particularly described with reference to the 21-tetrahydropyranyloxy - 16α,17α - isopropylidenedioxy - 20 - oxo - 4-pregneno-[3,2-c]pyrazole but are generally applicable to all the N-unsubstituted pyrazole compounds defined by compounds 12A and 12B of Flow Sheet A and compounds 26A and 26B of Flow Sheet C.

To a solution of 100 mg. of 21-tetrahydropyranyloxy-16α,17α - isopropylidenedioxy - 20 - oxo - 4 - pregneno-[3,2-c]pyrazole in 2 ml. of pyridine is added 2 ml. of acetic anhydride. The mixture is allowed to stand over night at room temperature. It is taken to dryness under vacuum to afford the N-acetyl-21-tetrahydropyranyloxy-16α,17α-isopropylidenedioxy-20-oxo-4-pregneno-[3,2-c]pyrazole.

In accordance with the above procedure but using an equivalent quantity of another acrylating agent in place of acetic anhydride, there is obtained the corresponding N-acyl derivatives.

Without further purification, this substance is dissolved in 5 ml. of methanol containing 20 mg. of p-toluenesulfonic acid. The mixture is kept at room temperature for 4 hours. The solvent is removed under vacuum, ethyl acetate is added and the organic layer is washed several times with dilute sodium bicarbonate. The dried solvent is removed to yield, after chromatography on neutral alumina, N - acetyl - 21 - hydroxy - 16α,17α - isopropylidenedioxy-20-oxo-4-pregneno-[3,2-c]pyrazole.

EXAMPLE 7

The following procedures which relate to Flow Sheet F are particularly described, starting with the 21-hydroxy-16α,17α - isopropylidenedioxy - 20 - oxo - 4 - pregneno-[3,2-c]pyrazole but are generally applicable to all the N-unsubstituted pyrazole compounds defined by compounds 13A and 13B of Flow Sheet B; compounds 25A and 25B of Flow Sheet C; compounds 29A and 29B of Flow Sheet D. When the N-substituted- derivatives are employed, the first step of forming the N-carbamoyl-derivative and the last step of removing the N-carbamoyl-group is omitted.

To a solution of 3.70 g. of 2-hydroxy-16α,17α-isopropylidenedioxy - 20 - oxo - 4 - pregneno - [3,2 - c]pyrazole in 150 ml. of methanol there is added 30 ml. of water containing 0.01 mole of hydrogen chloride. Then a solution of 0.81 g. of potassium cyanate in 8 ml. of water is added and this mixture is left over night at room temperature. Some of the methanol is removed under vacuum on the rotating evaporator; more water is added and the precipitate is collected by filtration. Recrystallization from methanol gives the N-carbamoyl pyrazole in sufficient purity for the next step.

To a solution of 85 mg. of N-carbamoyl-21-hydroxy-16α,17α - isopropylidenedioxy - 20 - oxo - 4 - pregneno-[3,2-c]pyrazole in 0.5 ml. of pyridine, cooled to 0° C., is added 0.03 ml. of methane sulfonyl chloride. The resulting mixture is allowed to stand at a temperature of approximately 0° C. for a period of approximately 1 hour. Water is then added to the reaction mixture and the precipitate which forms is recovered by extraction into ethyl acetate which is washed with water, dried and removed to give N-carbamoyl-21-hydroxy-16α,17α-isopropylidenedioxy-20-oxo-4-pregneno-[3,2-c]pyrazole 21-mesylate.

To 180 mg. of the above product dissolved in 10 ml. of acetone is added 300 mg. of sodium iodide. The resulting mixture is heated at reflux temperature for a period of approximately 1 hour, and the reaction solution is cooled to room temperature and diluted with water. Extraction with ethyl acetate followed by drying and removal of the solvent affords N-carbamoyl-21-iodo-16α,17α-isopropylidenedioxy-20-oxo-4-pregneno-[3,2-c]pyrazole.

The above product (100 mg.) is dissolved in a mixture of 5 ml. of water and 5 ml. of ethanol. To the resulting suspension is added 500 mg. of sodium bisulfite, and the mixture is heated under reflux for a period of about 1 hour. The reaction solution is cooled, diluted with water, and extracted with ethyl acetate. After removal of the ethyl acetate under vacuum, the residue is left over night under nitrogen in 5 ml. of methanol and 1 ml. of one molar sodium methoxide in methanol. The solvent is then removed under vacuum, ethyl acetate is added and, after a water wash, the solvent is dried and removed. Chromatography of the residue on neutral alumina effords some N-carbamoyl-16α,17α-isopropylidenedioxy-20-oxo-4-pregneno-[3,2-c]pyrazole.

Silver dihydrogen phosphate is prepared by the reaction of 32 g. of trisilver phosphate with 10 ml. of 100% phosphoric acid with thorough mixing in a one-liter 3-necked round-bottomed flask. The silver dihydrogen phosphate is washed with two portions of diethyl ether, which are removed by decantation, to remove some of the phosphoric acid. About 200 ml. of acetonitrile are added to cover the silver dihydrogen phosphate, and the mixture is heated to reflux temperature. At this point 20 g. of N-carbamoyl-21-iodo-16α,17α-isopropylidenedioxy-20-oxo-4-pregneno-[3,2-c]pyrazole is added and the mixture is refluxed in a nitrogen atmosphere with stirring for 75 minutes. The reaction mixture is then cooled over a period of about one hour to room temperature. Then 200 g. of ice water are added, and the acetonitrile is removed under vacuum at a temperature below 25° C. The pH of the resulting aqueous suspension is adjusted to 6.4 by the addition of 23 ml. of saturated aqueous sodium carbonate solution. A precipitate is formed and separated by filtration. The precipitate is washed with water until no ultraviolet absorbing material is detected in the wash water. The filtrate and wash water are combined and freeze dried to separate a solid material from the water. The solid material is triturated with a total of 770 ml. of methanol in seven portions. The methanol-insoluble material is separated by filtration. The filtrate is then concentrated under vacuum to 200 ml. and passed through a column containing 60 g. of a cation exchange resin ("IR-120") in its hydrogen form. The column is washed with methanol until the washings contain no ultraviolet absorbing material. The combined eluate and washings are concentrated to a volume of 15 ml., and 150 ml. of ether are added. The precipitate which forms is recovered by filtration, washed with ether, and dried for about 16 hours in a desiccator, to give N-carbamoyl-16α,17α-isopropylidenedioxy - 20 - oxo-4-pregneno-[3,2-c]pyrazole 21-dihydrogen phosphate.

A mixture of N-carbamoyl-21-hydroxy-16α,17α-isopropylidenedioxy-20-oxo-4-pregneno-[3,2-c]pyrazole 21-mesylate (0.75 g.), lithium chloride (202 mg.) and dimethylformamide (30 ml.) are heated under reflux for 50 minutes, concentrated under vacuum to a small volume, and treated with water. The solid so formed is separated by filtration and recrystallized to afford the N-carbamoyl-21-chloro - 16α,17α - isopropylidenedioxy-20-oxo-4-pregneno-[3,2-c]pyrazole.

To a solution of 62 mg. of N-carbamoyl-21-hydroxy-16α,17α - isopropylidenedioxy-20-oxo-4-pregneno-[3,2-c] pyrazole 21-mesylate in 1 ml. of freshly distilled anhydrous dimethylformamide is added enough anhydrous potassium fluoride to assure a saturated solution. The mixture is heated at 110° C. for 20 hours. Water is added to the cooled solution and the product is extracted into chloroform dried over sodium sulfate and evaporated to dryness. The resulting product is N-carbamoyl-21 - fluoro - 16α,17α - isopropylidenedioxy - 20 - oxo - 4-pregneno-[3,2-c]pyrazole.

To a solution of 355 mg. of N-carbamoyl-16α,17α-isopropylidenedioxy - 20 - oxo-4-pregneno-[3,2-c]pyrazole in 35 ml. of glacial acetic acid there is added slowly with stirring 104 mg. of sodium nitrite in 5 ml. of water. After fifteen minutes at room temperature, most of the acetic acid is removed at room temperature on the rotating evaporator. Ethyl acetate is added and this solution is extracted several times with sodium bicarbonate and then dried. Removal of the solvent, followed by chromatography on alumina, affords 16α,17α-isopropylidenedioxy-20-oxo-4-pregneno-[3,2-c]pyrazole.

In accordance with the above procedure but starting with the N-carbamoyl-21-fluoro-, or the N-carbamoyl-21-chloro - 16α,17α - isopropylidenedioxy-20-oxo-4-pregneno-[3,2-c]pyrazole the corresponding 21-fluoro- or the 21-chloro - 16α,17α - isopropylidenedioxy-20-oxo-4-pregneno-[3,2-c]pyrazole is obtained.

16α,17α - isopropylidenedioxy - 20 - oxo - 4 - pregneno-[3,2-c]pyrazole (1.5 g.) is added to 150 ml. of refluxing 60% formic acid. After twenty minutes, the solution is cooled and then poured into ice and water. After 18 hours, the 16α,17α-dihydroxy-20-oxo-4-pregneno-[3,2-c] pyrazole is collected by filtration and dried.

Various changes and modifications may be made in carrying out the present invention without departing from the spirit and scope thereof. Insofar as these changes and modifications are within the purview of the annexed claims, they are to be considered as part of our invention.

We claim:
1. A compound selected from the group consisting of 6-fluoro-16α,17α,21-trihydroxy-20-oxo-4,6 - pregnadieno-[3,2-c]pyrazole and the 16α,17α-acetonide thereof.

2. A compound selected from the group consisting of 6-fluoro-16α,17α,21-trihydroxy-20-oxo-2' - phenyl - 4,6-pregnadieno-[3,2-c]pyrazole and the 16α,17α - acetonide thereof.

3. A compound selected from the group consisting of 6-fluoro-16α,17α,21-trihydroxy-20-oxo - 2' - (p - fluorophenyl)-4,6-pregnadieno-[3,2-c]pyrazole and the 16α,-17α-acetonide thereof.

4. A compound selected from the group consisting of 16α,17α,21-trihydroxy-6-methyl-20-oxo-4,6 - pregnadieno-[3,2-c]pyrazole and the 16α,17α-acetonide thereof.

5. A compound selected from the group consisting of 16α,17α,21-trihydroxy-6-methyl-20-oxo-2' - phenyl - 4,6-pregnadieno-[3,2-c]pyrazole and the 16α,17α-acetonide thereof.

6. A compound selected from the group consisting of 16α,17α,21-trihydroxy-6-methyl-20-oxo-2' - (p - fluorophenyl)-4,6-pregnadieno-[3,2-c]pyrazole and the 16α,17α-acetonide thereof.

7. A compound selected from the group consisting of

16α,17α,21-trihydroxy-20-oxo-4,6-pregnadieno - [3,2 - c] pyrazole and the 16α,17α-acetonide thereof.

8. A compound selected from the group consisting of 16α,17α,21-trihydroxy-20-oxo-2'-phenyl - 4,6 - pregnadieno-[3,2-c]pyrazole and the 16α,17α-acetonide thereof.

9. A compound selected from the group consisting of 16α,17α,21-trihydroxy-20-oxo-2'-(p - fluorophenyl) - 4,6-pregnadieno-[3,2-c]pyrazole and the 16α,17α-acetonide thereof.

10. A compound selected from the group consisting of 16α,17α,21-trihydroxy-20-oxo-4-pregneno - [3,2 - c]pyrazole and the 16α,17α-acetonide thereof.

11. A compound selected from the group consisting of 16α,17α,21-trihydroxy-20-oxo-2' - phenyl - 4 - pregneno-[3,2-c]pyrazole and the 16α,17α-acetonide thereof.

12. A compound selected from the group consisting of 16α,17α,21-trihydroxy-20-oxo-2' - (p - fluorophenyl) - 4-pregneno-[3,2-c]pyrazole and the 16α,17α - acetonide thereof.

13. A compound selected from the group consisting of 16α,17α,21-trihydroxy-6α-methyl-20-oxo-2' - phenyl - 4-pregneno-[3,2-c]pyrazole and the 16α,17α - acetonide thereof.

14. A compound selected from the group consisting of 16α,17α,21-trihydroxy-6α-methyl-20-oxo-2' - (p - fluorophenyl -4-pregneno-[3,2-c]pyrazole and the 16α,17α-acetonide thereof.

15. A compound selected from the group consisting of 16α,17α,21-trihydroxy-6α-methyl-20-oxo - 4 - pregneno-[3,2-c]pyrazole and the 16α,17α-acetonide thereof.

16. A compound selected from the group consisting of compounds represented by the formulas:

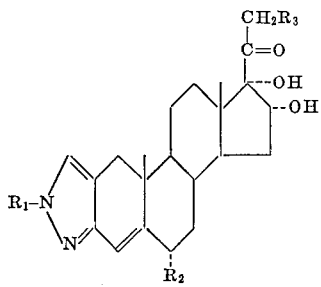

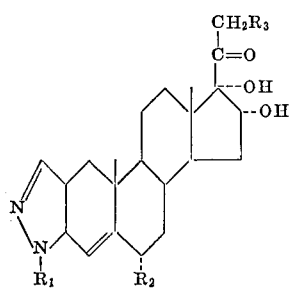

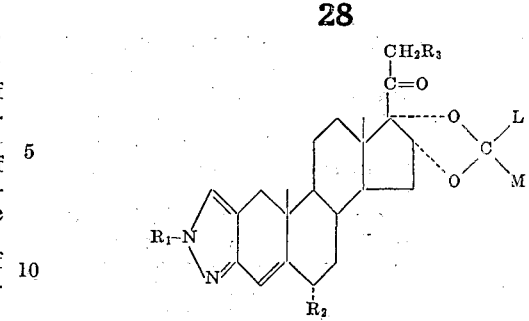

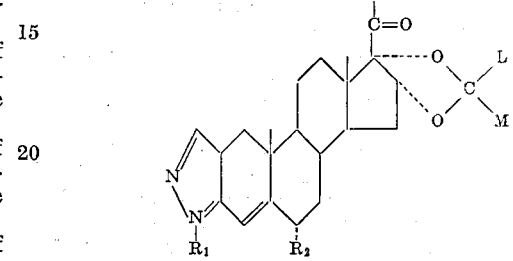

wherein $R_1$ is a member of the group consisting of hydrogen, lower hydrocarbon carboxylic acyl, lower alkyl, lower aralkyl, lower cycloalkyl, lower hydrocarbon aryl, halophenyl, lower alkoxyphenyl, nitrophenyl, pyridyl, pyridyl ovide, pyrimidyl and thienyl, $R_2$ is a member of the group consisting of hydrogen, methyl, fluorine and chlorine, $R_3$ is a member of the group consisting of hydrogen, chlorine, fluorine, hydroxyl, lower hydrocarbon carboxylic acyl, the dihydrogen phosphate and the alkali metal salts of said dihydrogen phosphate, L and M are each selected from the group consisting of hydrogen, lower alkyl and aryl and together with the carbon atom to which they are joined L and M are cycloalkyl, and pharmacologically acceptable salts of the foregoing compounds.

References Cited

UNITED STATES PATENTS

| | | | |
|---|---|---|---|
| 3,001,991 | 9/1961 | Allen et al. | 260—239.55 |
| 3,072,639 | 1/1963 | Hirschmann et al. | 260—239.55 |
| 3,072,640 | 1/1963 | Hirschmann et al. | 260—239.5 |
| 3,072,641 | 1/1963 | Hirschmann et al. | 260—239.5 |
| 3,072,642 | 1/1963 | Hirschmann et al. | 260—239.5 |
| 3,079,384 | 2/1963 | Diassi et al. | 260—239.55 |
| 3,094,540 | 6/1963 | Hirschmann | 260—397.4 |

HENRY A. FRENCH, Primary Examiner

U.S. Cl. X.R.

195—51; 260—239.55, 397.47, 999